United States Patent
Yu et al.

(10) Patent No.: US 7,259,804 B2
(45) Date of Patent: Aug. 21, 2007

(54) METHOD FOR FABRICATING TOUCH PANEL INTEGRATED LIQUID CRYSTAL DISPLAY DEVICE

(75) Inventors: Hwan Seong Yu, Kyongsangbuk-do (KR); Yong Ik Bang, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 210 days.

(21) Appl. No.: 10/740,509

(22) Filed: Dec. 22, 2003

(65) Prior Publication Data

US 2004/0212749 A1    Oct. 28, 2004

(30) Foreign Application Priority Data

Dec. 24, 2002   (KR) ................. 10-2002-0083306

(51) Int. Cl.
    *G02F 1/1335* (2006.01)
(52) U.S. Cl. ................. 349/12; 349/173; 349/187
(58) Field of Classification Search ............. 349/12, 349/187, 158, 173; 345/173
    See application file for complete search history.

(56) References Cited

U.S. PATENT DOCUMENTS 6,275,277 B1 * 8/2001 Walker et al. ............. 349/113
6,380,497 B1 * 4/2002 Hashimoto et al. ......... 200/5 A
6,580,483 B2 * 6/2003 Suzuki et al. ............... 349/115

FOREIGN PATENT DOCUMENTS

| JP | 2002-72184 | 3/2002 |
| KR | 2001-33970 | 7/1999 |
| KR | 2002-0001638 | 1/2001 |

OTHER PUBLICATIONS

Bahadur, Liquid Crystals 1990, World Scientific, vol. 1, pp. 173-188.*

* cited by examiner

*Primary Examiner*—David Nelms
*Assistant Examiner*—David Y. Chung
(74) *Attorney, Agent, or Firm*—McKenna Long & Aldridge LLP

(57) ABSTRACT

The present invention discloses a method of fabricating a touch panel for a liquid crystal display device including forming a parent touch panel having a plurality of unit touch panels and a parent polarizer, laminating the parent touch panel and the parent polarizer, and cutting the laminated parent touch panel and parent polarizer into a plurality of single touch panel units and forming a plurality of polarizer integrated touch panels.

8 Claims, 6 Drawing Sheets

METHOD FOR FABRICATING TOUCH PANEL INTEGRATED LIQUID CRYSTAL DISPLAY DEVICE

This application claims the benefit of the Korean Patent Application No. P2002-083306 filed on Dec. 24, 2002, which is hereby incorporated by reference.

BACKGROUND OF THE INVENTION

1. Field of the Invention

The present invention relates to a liquid crystal display device, and more particularly, to a method for fabricating a touch panel integrated liquid crystal display device. Although the present invention is suitable for a wide scope of applications, it is particularly suitable for improving misalignment between a polarizer and a touch panel.

2. Discussion of the Related Art

In order to make an efficient use of various electronic devices, touch panels for inputting signals on a display screen of a display device without any separate inputting device, such as a remote controller, has been widely used. More specifically, a device having a display screen is formed on flat display devices, such as liquid crystal display devices (LCD's), plasma display panels (PDP's), and electro luminescence (EL) displays, and conventional display devices such as cathode ray tubes (CRT's), namely a touch panel, thereby allowing a user to select desired information while viewing a picture.

Particularly, touch panels that are integrated with or added to computers, portable transmission devices, spherical and non-spherical display devices and other personal digital assistants (PDA's) are described as an input device. Unlike other input devices, such as a mouse or a keyboard, the inputting process of the touch panels is simple, misoperations are much less, and characters can be manually input.

The recently developed touch panels provide high reliability, new functions, durability, and precise technologies, such as technologies related to fabrication processes including handling materials and substances, and designing and processing techniques, rather than other typical functions of a touch panel.

The above-described touch panels can be categorized as an analog resistive type, a digital resistive type, a capacitive type, a supersonic type, an infrared sensor type, and an electromagnetic induction type, depending on the method of detecting a touch on the touch panel.

The parent structure of the touch panel includes an upper transparent substrate having an upper electrode, and a lower transparent substrate having a lower electrode. The upper transparent substrate is mounted on the lower transparent substrate so as to provide a space therebetween. Therefore, when an inputting means, such as a finger or a pen, touches a specific point on the upper substrate, the upper electrode of the upper transparent substrate and the lower electrode of the lower transparent substrate are electrically connected to each other. Subsequently, a controlling device reads a voltage changed by either a resistance or a capacitor at the touching point. Thereafter, a position coordinate is located based on the change in the potential difference.

The related art analog resistive layer type touch panel will be described with reference to the accompanying drawings.

FIG. 1 illustrates a plane view of a touch panel of the related art, and FIG. 2 illustrates a cross-sectional view taken along line I-I of FIG. 1, showing a resistive layer type touch panel 100 formed at a display surface of a liquid crystal display device to be used as a signal inputting means.

As shown in FIGS. 1 and 2, the touch panel includes a viewing area VA corresponding to the display surface of the liquid crystal display device, and a dead space DS surrounding the edge surface of the viewing space VA. In the dead space DS, the upper and lower substrates 110 and 120, each formed of a poly-ethelene-terephtalate (PET) layer, are spaced apart and bonded to each other by an insulating sealant 130. An upper transparent electrode 111 and a lower transparent electrode 121 are formed on the inner surfaces of upper and lower substrates 110 and 120, respectively, thereby having a rectangular shape corresponding to the viewing area VA. In addition, a signal line 140 applying a voltage to the upper and lower transparent electrodes 111 and 121 and reading a voltage change based on a randomly touched position, is connected to one of the upper transparent electrode 111 and the lower transparent electrode 121 in the dead space DS and extended to the outside. A plurality of dot spacers 150 formed of an insulating synthetic resin, such as epoxy resin, acrylic resin, and the like, is formed to be spaced apart from one another so that the upper and lower transparent electrodes 111 and 121 are not touched to each other with an unintended slight pressure.

Therefore, when a pressure is applied to a specific point on the upper substrate 110 by a pen or a finger, the upper and lower transparent electrodes 111 and 121 touch each other at the specific touched point. Subsequently, a voltage changed by the resistance value at the touched point is output through the signal line 140. In addition, when the user's hand or finger unintentionally touches the operating surface, the dot spacers 150 prevent the unintentionally touched point from being detected as a touched point.

FIG. 3 illustrates a cross-sectional view of the related art touch panel integrated liquid crystal display device. The touch panel integrated liquid crystal display device includes a lower polarizer 310, a liquid crystal panel 320 having a lower substrate 321 formed on the lower polarizer 310 and an upper substrate 322 formed on the lower substrate 321, an upper polarizer 330 formed on the upper substrate 322, and a touch panel 100 having a lower substrate 120 formed on the upper polarizer 330 and an upper substrate 110 formed on the lower substrate 120. Additionally, a case top 340 is formed on each side surface of the entire structure and edge portions of the touch panel 100.

The upper substrate 322 and the substrate 321 of the liquid crystal panel 320 each includes a color filter array (not shown) and a thin film transistor array (not shown). A liquid crystal layer (not shown) is filled between the upper and lower substrates 322 and 321.

Additionally, as shown in FIG. 2, upper and lower transparent electrodes 111 and 112, a plurality of dot spacers 150, and an insulating sealant 130 are formed between the upper and lower substrates 110 and 120 of the touch panel 100.

A method for fabricating the touch panel integrated liquid crystal display device shown in FIG. 3 will now be described in detail.

FIG. 4 is a plane view illustrating the laminating process of a touch panel and a polarizer in fabricating the related art touch panel integrated liquid crystal display device.

As shown in FIG. 4, a film type polarizer integrated touch panel 100+330 is formed by laminating the completed touch panel 100 to the upper polarizer, which is cut to fit the size of the touch panel, using a laminator. Subsequently, the polarizer integrated touch panel 100+330 is attached to the upper surface of the liquid crystal panel 320 having the upper and lower substrates 321 and 322 bonded to each other, and the lower polarizer 310 attached to the lower surface of the lower substrate 322.

Alternatively, the upper polarizer 330 is first attached to the upper surface of the liquid crystal panel 320, and the completed touch panel 100 is then laminated to the upper surface of the upper polarizer 330.

The method for forming the polarizer integrated touch panel 100+330 will now be described in detail.

As shown in FIG. 4, the touch panel 100 completed as a single body and the upper polarizer 330, which is cut to fit the size of the touch panel 100, are prepared.

The touch panel 100 is formed of a parent touch panel having a plurality of unit touch panels. The upper polarizer 330 is formed of a polyvinyl alcohol (PVA) layer having a two-tone coating material, such as iodine or a two-tone colorant, adsorbed and aligned thereon, and a triacetyl acetate (TAC) layer acting as a passivation layer disposed on the upper and lower surfaces of the PVA layer to be attached and bonded thereto.

As described above, the parent touch panel and the upper polarizer are cut into a plurality of units prior to the laminating process.

Subsequently, the touch panel 100 each cut and completely formed into a single unit size, and the upper polarizer 330 cut to align with the size of the touch panel 100 are attached to one another other by using the laminator. When the laminating process is carried out during the fabrication process, the touch panel 100 and the upper polarizer 330 can be attached to form different structures, as shown in FIGS. 5A to 5C.

FIG. 5A illustrates a precise alignment of the touch panel 100 and the upper polarizer 330. However, when laminating the touch panel 100 and the upper polarizer 330 each formed separately, the touch panel 100 and the upper polarizer 330 tend to be misaligned, as shown in FIG. 5B. Occasionally, as shown in FIG. 5C, the upper polarizer 330 may also be formed to have a size that does not correctly aligned with the touch panel.

Therefore, the above-described related art touch panel integrated liquid crystal display device having a polarizer is disadvantageous in that when laminating the touch panel and the upper polarizer, each being formed separately, the problem of misalignment and/or difference in size may occur.

SUMMARY OF THE INVENTION

Accordingly, the present invention is directed to a method for fabricating a touch panel integrated liquid crystal display device that substantially obviates one or more of problems due to limitations and disadvantages of the related art.

Another object of the present invention is to provide a method for fabricating a touch panel integrated liquid crystal display device that can have a touch panel and a polarizer attached to each other without any misalignment or difference in size.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a touch panel for a liquid crystal display device includes forming a parent touch panel having a plurality of unit touch panels and a parent polarizer, laminating the parent touch panel and the parent polarizer, and cutting the laminated parent touch panel and parent polarizer into a plurality of touch panel units to form a plurality of polarizer integrated touch panels.

In another aspect of the present invention, a method of fabricating a touch panel integrated liquid crystal display device includes individually forming a parent polarizer and a parent touch panel including a plurality of unit touch panels, which is integrated with a parent liquid crystal display panel including a plurality of unit liquid crystal display panels, laminating the parent touch panel and the parent polarizer, and separating the laminated parent touch panel and parent polarizer into a plurality of the unit touch panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 6:
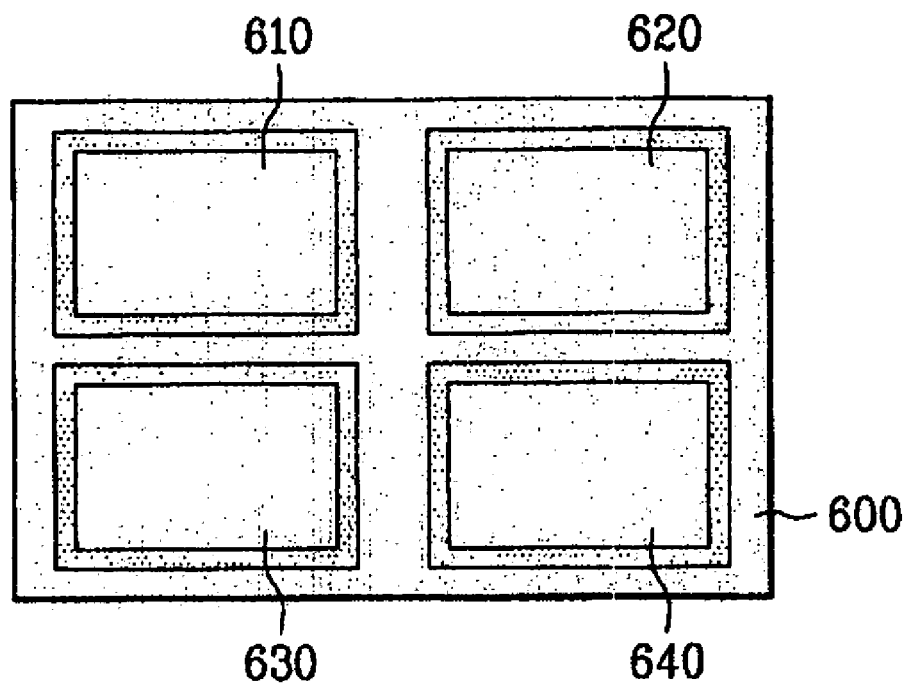
FIGS. 6 and 7 illustrate the process of laminating a touch panel integrated liquid crystal display device according to the present invention.
Figure 6:
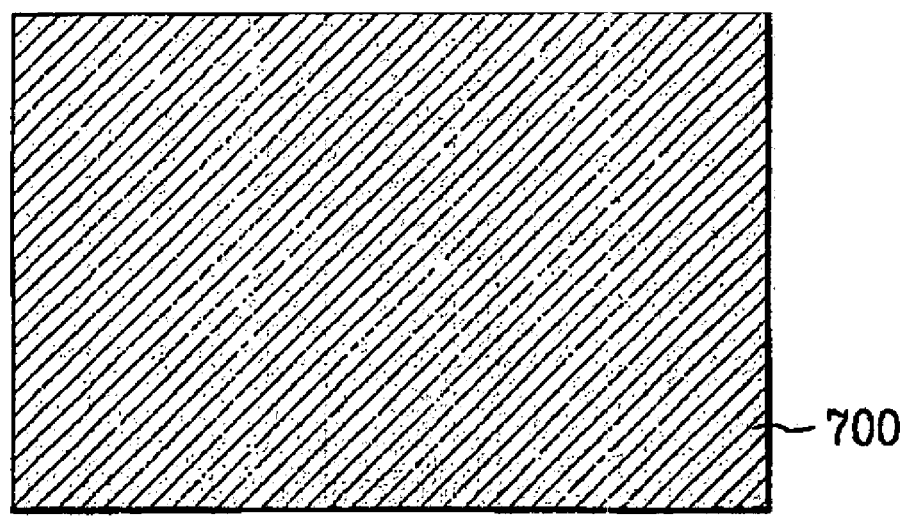
Figure 7:
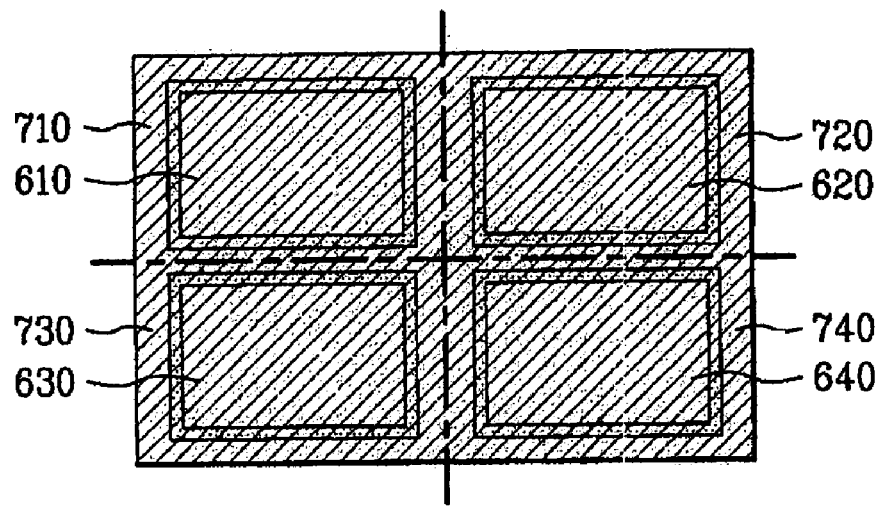

FIGS. 6 and 7 illustrate the process of laminating a touch panel integrated liquid crystal display device according to the present invention.

As shown in FIG. 6, a parent touch panel 600 including a plurality of unit touch panels 610, 620, 630, and 640 formed in each predetermined region, and a parent polarizer 700 having a size corresponding to that of the parent touch panel 600 are prepared.

Figure 2:
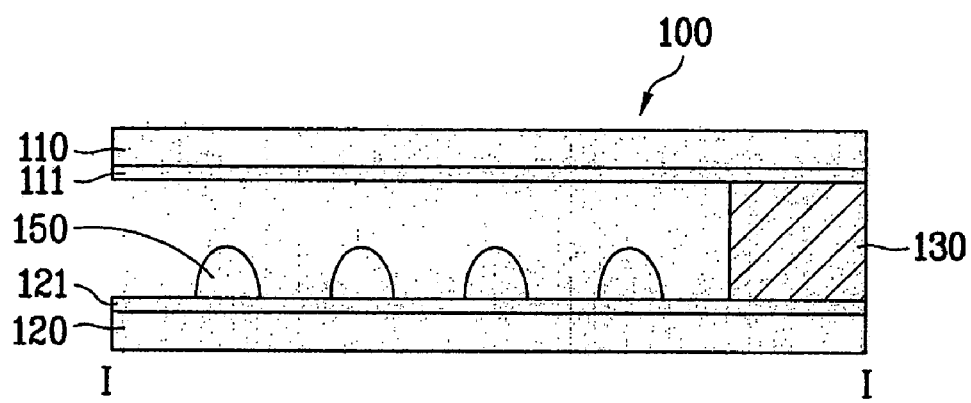
FIG. 2 illustrates a cross-sectional view taken along line I-I of FIG. 1.

Although it is not shown in FIG. 6, the parent touch panel 600 includes an upper substrate and a lower substrate each formed of a poly-ethelene-terephtalate (PET) material and having a viewing area and a dead space, a plurality of electrodes each corresponding to the upper and lower substrates and facing into each other, a dot space formed between the electrodes of the upper and lower substrates, and a plurality of unit touch panels 610, 620, 630, and 640 each formed in a designated region by attaching the upper and lower substrates with a double-sided adhesive in the dead space. More specifically, when cutting the parent touch panel 600 into each of the unit touch panels 610, 620, 630, and 640, each unit touch panel 610, 620, 630, and 640 is formed to have the same structure as that of the separately formed touch panel 100, shown in FIG. 2.

Figure 3:
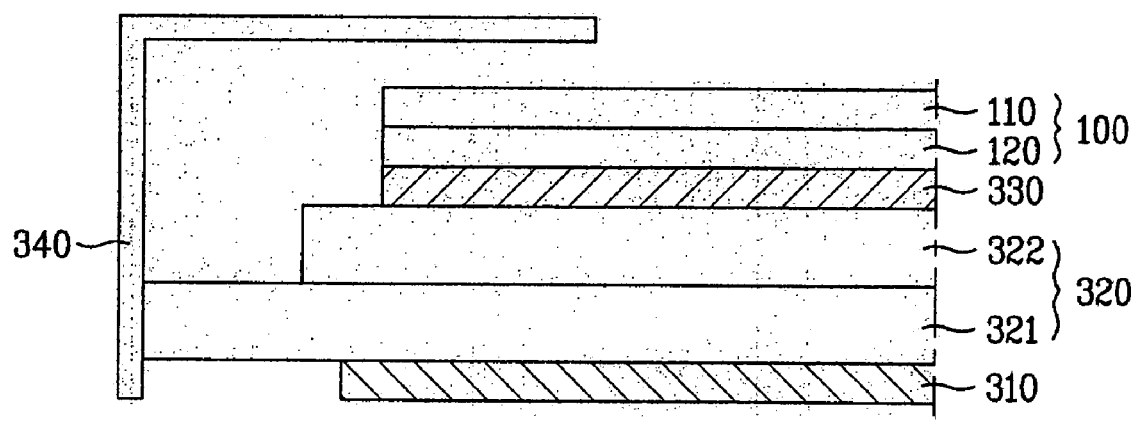
FIG. 3 illustrates a cross-sectional view of the related art touch panel integrated liquid crystal display device.
Figure 4:
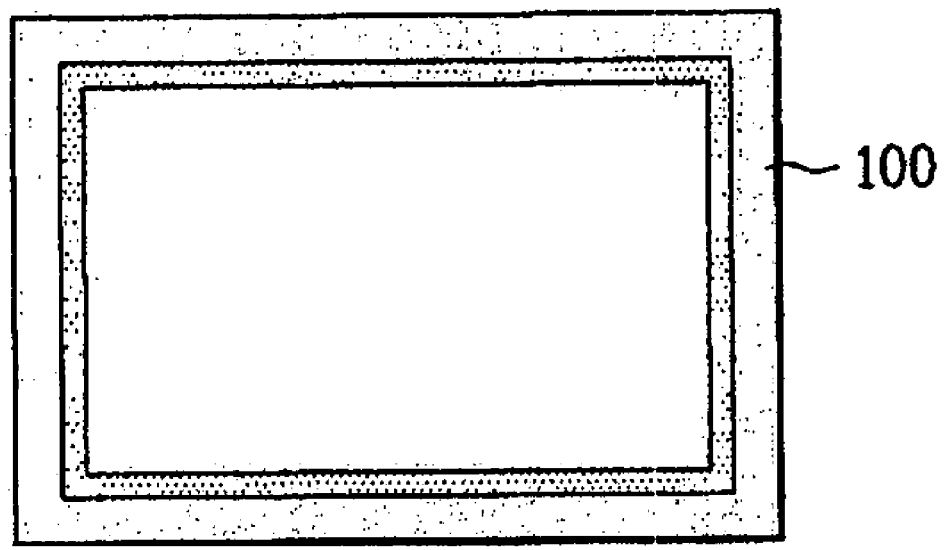
FIG. 4 is a plane view illustrating the laminating process of a touch panel and a polarizer in fabricating the related art touch panel integrated liquid crystal display device.
Figure 4:
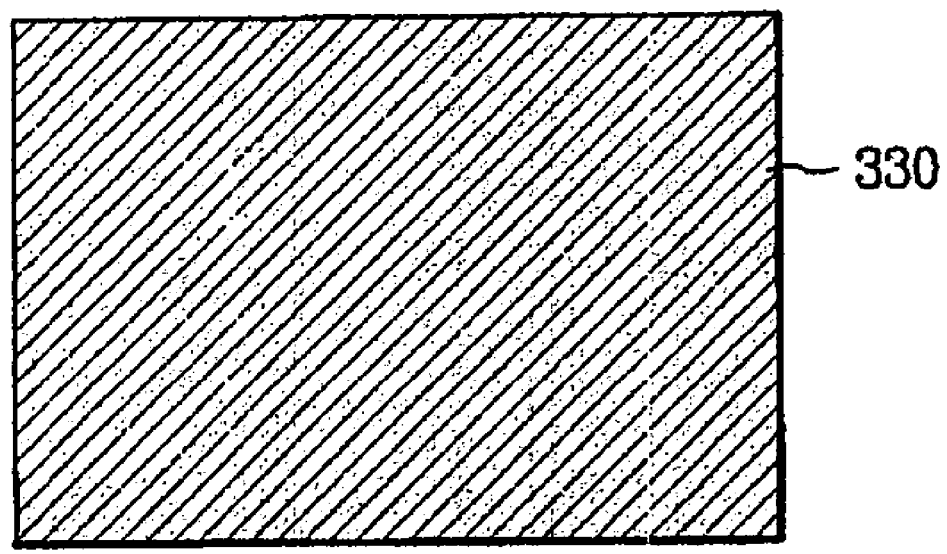
Figure 5A:
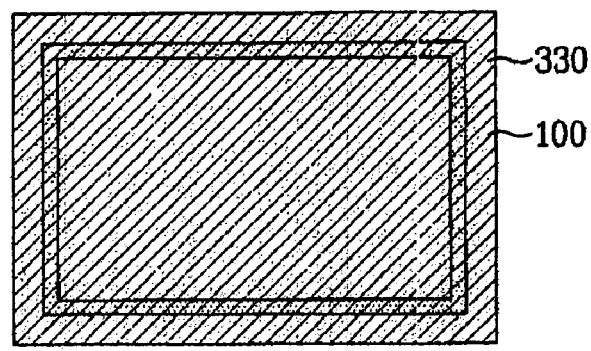
FIGS. 5A to 5C illustrate plane views of various laminated structures with carrying out the laminating process of FIG. 4.
Figure 5B:
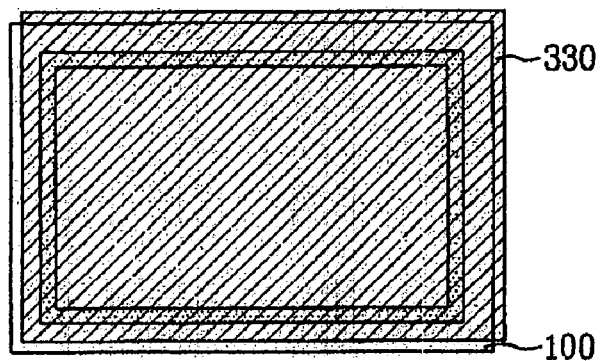
Figure 5C:
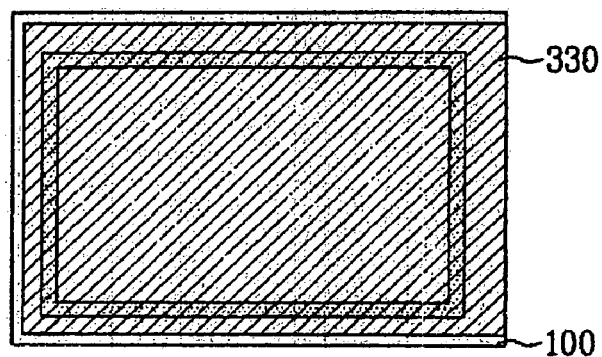

In addition, a parent polarizer 700 is formed of an optical film consisting of a polyvinyl alcohol (PVA) layer having a two-tone coating material, such as iodine or a two-tone colorant, adsorbed and aligned thereon, and a triacetyl acetate (TAC) layer acting as a passivation layer disposed on the upper and lower surfaces of the PVA layer to be attached thereto. The structure of the parent polarizer 700 is substantially the same as the upper polarizer 300 of FIG. 3, which is used as the upper polarizer of the liquid crystal panel (not shown).

Subsequently, the lower surface of the parent touch panel 600 and the upper surface of the parent polarizer 700 are laminated to each other by using a laminator. Then, as shown in FIG. 7, the laminated parent touch panel 600 and the parent polarizer 700 are cut along the imaginary dash-dot cutting line marked thereon to match the size of each unit touch panel 610, 620, 630, and 640.

When laminating the parent touch panel 600 and the parent polarizer 700, the parent polarizer 700 must be laminated to face into the lower polarizer of the liquid crystal panel.

More specifically, the directions of the absorption axis of the upper polarizer and the absorption axis of the lower polarizer are determined in accordance with a mode type of the liquid crystal display panel, one of a normally white mode (NW mode) and a normally black mode (NB mode), and the mode type of the polarizer, one of an ordinary mode (O mode) and an extraordinary mode (E mode).

In this case, an adhesive layer is formed on one of the lower surface of the parent touch panel 600 and the upper surface of the parent polarizer 700. Then, the laminating process is carried out by using a laminator. The adhesive layer is formed of an adhesive on both the upper and lower surfaces.

Figure 8:
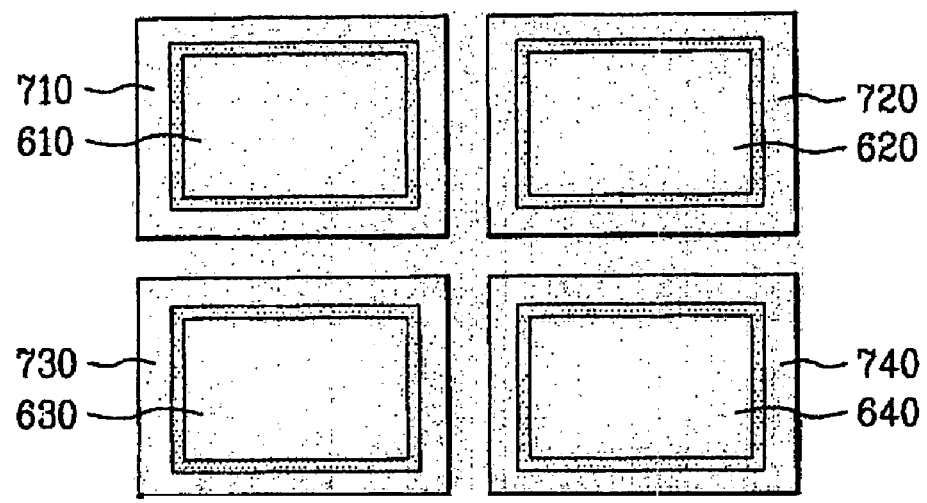
FIG. 8 illustrates a plane view of a completed touch panel integrated liquid crystal display device according to the present invention.

After the laminating process, the laminated parent touch panel 600 and the parent polarizer 700 then simultaneously match the size of each single unit touch panel 610, 620, 630, and 640, as shown in FIG. 8, thereby forming a plurality of polarizer integrated touch panels 610+710, 620+720, 630+730, and 640+740. In this process, a misalignment caused during the laminating process of the related art can be prevented. In addition, the laminating process according to the present invention prevents a difference in cut-size that may occur during the cutting process. In other words, the touch panel and the polarizer are first bonded to one another, thereby preventing the unit touch panels and the unit polarizers from being misaligned during the laminating process.

Subsequently, although not shown in the drawings, a liquid crystal panel having a lower polarizer formed on the lower surface is prepared. The polarizer integrated touch panels 610+710, 620+720, 630+730, and 640+740 are then attached to the upper surface of the liquid crystal panel.

Since the liquid crystal panel, which is disposed on the lower portion, generally has more margin as compared to the unit touch panels 610, 620, 630, and 640, during the laminating process, the unit touch panels 610, 620, 630, and 640 are aligned in accordance with the liquid crystal panel. Additionally, an adhesive layer is formed in advance on the lower surface of each unit polarizer 710, 720, 730, and 740, without any separate adhesive material, so that the laminating process with the liquid crystal panel becomes simple.

Figure 1:
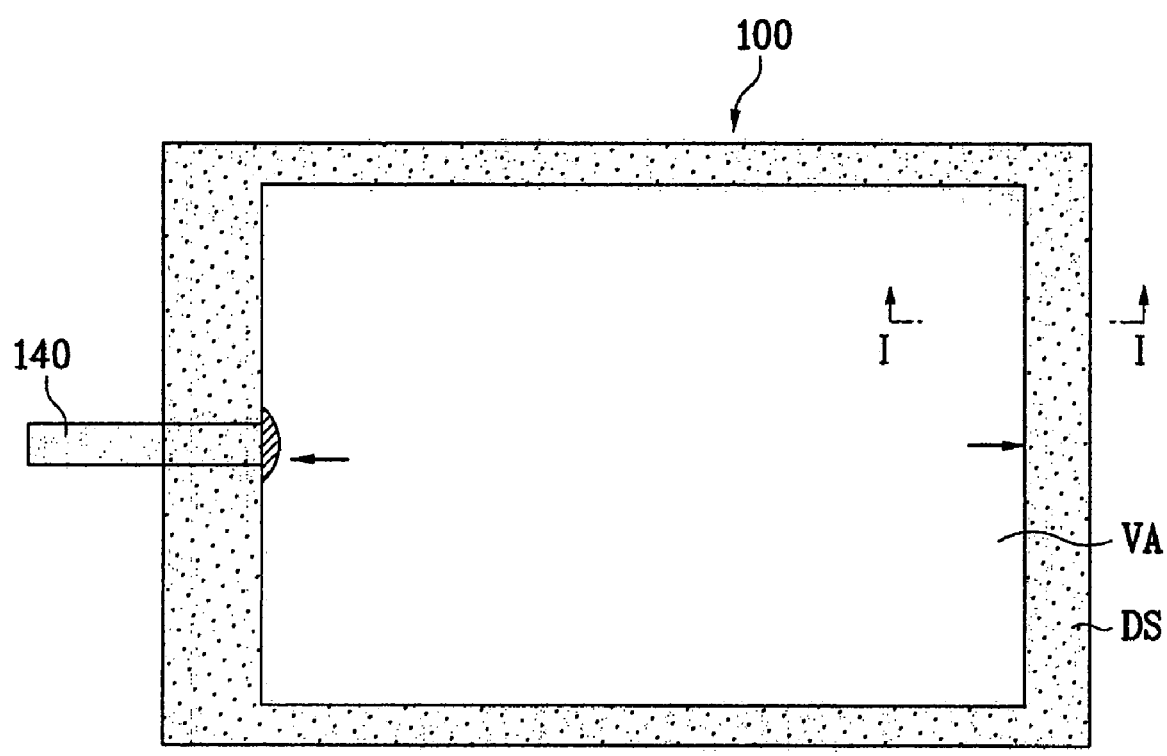
FIG. 1 illustrates a plane view of a touch panel of the related art.

Meanwhile, a signal line (not shown) is formed on a portion of the dead space of each cut polarizer integrated touch panel 610+710, 620+720, 630+730, and 640+740. The signal line (not shown) is identical to the signal line 140 of FIG. 1.

Also, the liquid crystal panel includes an upper substrate having a color filter array, a lower substrate having a thin film transistor (TFT) array, and a liquid crystal layer injected between the upper and lower substrates. Since the lower substrate includes a gate driver and a source driver, the lower substrate is formed to have a margin larger than that of the upper substrate.

Furthermore, in transmissive liquid crystal display devices, a backlight unit is formed on the lower substrate. In reflective liquid crystal display panels, a case top is formed to cover a portion of the dead space of the touch panel by surrounding the touch panel and side portions of the liquid crystal panel without any backlight unit.

The polarizer integrated touch panel according to the present invention has the following advantages.

The parent upper polarizer of the liquid crystal panel and the parent touch panel are laminated to each other and cut into complete and single units, thereby maintaining an identical size of the upper polarizer and the touch panel. Thus, the problems of the misalignment and the size difference can be resolved.

It will be apparent to those skilled in the art that various modifications and variations can be made in the method for fabricating the touch panel integrated liquid crystal display device of the present invention without departing from the spirit or scope of the inventions. Thus, it is intended that the present invention covers the modifications and variations of this invention provided they come within the scope of the appended claims and their equivalents.

What is claimed is:

1. A method of fabricating a touch panel for a liquid crystal display device, comprising:

forming a parent touch panel having a plurality of unit touch panels and a parent polarizer having a plurality of unit polarizers, wherein the parent touch panel includes an upper substrate and a lower substrate facing each other, a transparent electrode formed on each inner surface of the upper and lower substrates, a plurality of dot spacers formed between the upper and lower substrates, and a plurality of dead spaces defining the plurality of unit touch panels;

laminating the parent touch panel and the parent polarizer; and cutting the laminated parent touch panel and parent polarizer along a cutting line formed between the plurality of dead spaces into a plurality of touch panels integrated with a polarizer.

2. The method of claim 1, wherein the parent polarizer has a size substantially the same as the parent touch panel.

3. The method of claim 1, wherein the parent touch panel and the parent polarizer are attached to each other by an adhesive layer.

4. The method of claim 3, wherein the adhesive layer is formed on one of the parent polarizer and the parent touch panel.

5. The method of claim 3, wherein the parent touch panel and the parent polarizer are laminated by a laminator.

6. The method of claim 1, wherein the parent polarizer comprises an optical layer, and a passivation layer formed on an upper surface and a lower surface of the optical layer.

7. The method of claim 1, further comprising:
    forming a liquid crystal panel having a polarizer on a lower surface thereof; and
    laminating the liquid crystal panel and the polarizer integrated touch panel.

8. The method of claim 7, wherein the liquid crystal panel comprises an upper substrate and a lower substrate facing into each other, a color filter layer formed on the upper substrate, a thin film transistor array formed on the lower substrate, and a liquid crystal layer formed between the upper and lower substrates.

* * * * *